(12) United States Patent
Nicoletti et al.

(10) Patent No.: US 10,657,533 B2
(45) Date of Patent: May 19, 2020

(54) APPARATUS AND METHOD FOR EMULATING ONLINE USER AUTHENTICATION PROCESS IN OFFLINE OPERATIONS

(71) Applicant: MasterCard International Incorporated, Purchase, NY (US)

(72) Inventors: Laurie Ann Nicoletti, White Plains, NY (US); Dawid Nowak, Dublin (IE); Cian Burns, Dublin (IE)

(73) Assignee: Mastercard International Incorporated, Purchase, NY (US)

( * ) Notice: Subject to any disclaimer, the term of this patent is extended or adjusted under 35 U.S.C. 154(b) by 209 days.

(21) Appl. No.: 15/794,647

(22) Filed: Oct. 26, 2017

(65) Prior Publication Data
US 2019/0130410 A1 May 2, 2019

(51) Int. Cl.
*G06Q 20/40* (2012.01)
*G07F 7/12* (2006.01)
*G06Q 20/32* (2012.01)

(52) U.S. Cl.
CPC ....... *G06Q 20/40145* (2013.01); *G06Q 20/32* (2013.01); *G07F 7/125* (2013.01)

(58) Field of Classification Search
CPC ........ G06Q 40/00; G06Q 30/00; G06Q 20/00; G06Q 10/00
USPC ...................................................... 705/3–44
See application file for complete search history.

(56) References Cited

U.S. PATENT DOCUMENTS

| | | | |
|---|---|---|---|
| 4,683,552 A * | 7/1987 | Kambayashi | G09G 5/40 345/551 |
| 9,875,346 B2 * | 1/2018 | Pitschel | G06F 21/305 |
| 10,055,721 B1 * | 8/2018 | Mocko | G06Q 20/202 |
| 2014/0283141 A1 * | 9/2014 | Shepherd | G06F 3/0482 726/30 |
| 2014/0283142 A1 * | 9/2014 | Shepherd | G06F 3/0482 726/30 |
| 2016/0005038 A1 | 1/2016 | Kamal et al. | |
| 2016/0342258 A1 * | 11/2016 | Han | G06F 3/033 |
| 2017/0193498 A1 | 7/2017 | Metral et al. | |

OTHER PUBLICATIONS

"The Mobile Payments and NFC Landscape: A U.S. Perspective", A Smart Card Alliance Payments Council White Paper, Smart Card Alliance, Publication No. PC-11002 (Year: 2011).*
"PCT Notification of Transmittal of the International Search Report and the Written Opinion", International Searching Authority, dated Jan. 9, 2019 (Sep. 1, 2019), International Application No. PCT/US2018/052138, 10 pp.

* cited by examiner

*Primary Examiner* — Frantzy Poinvil
(74) *Attorney, Agent, or Firm* — Buckley, Maschoff & Talwalkar LLC (57) ABSTRACT

A payment-enabled mobile device is operable in a first operating mode and a second operating mode. The first mode is an online operating mode. The second mode is an offline operating mode. The payment-enabled mobile device operates in the second operating mode to replicate a screen display sequence presented by the payment-enabled mobile device in the first operating mode.

17 Claims, 8 Drawing Sheets

FIG. 7

APPARATUS AND METHOD FOR EMULATING ONLINE USER AUTHENTICATION PROCESS IN OFFLINE OPERATIONS

BACKGROUND

Figure 1:
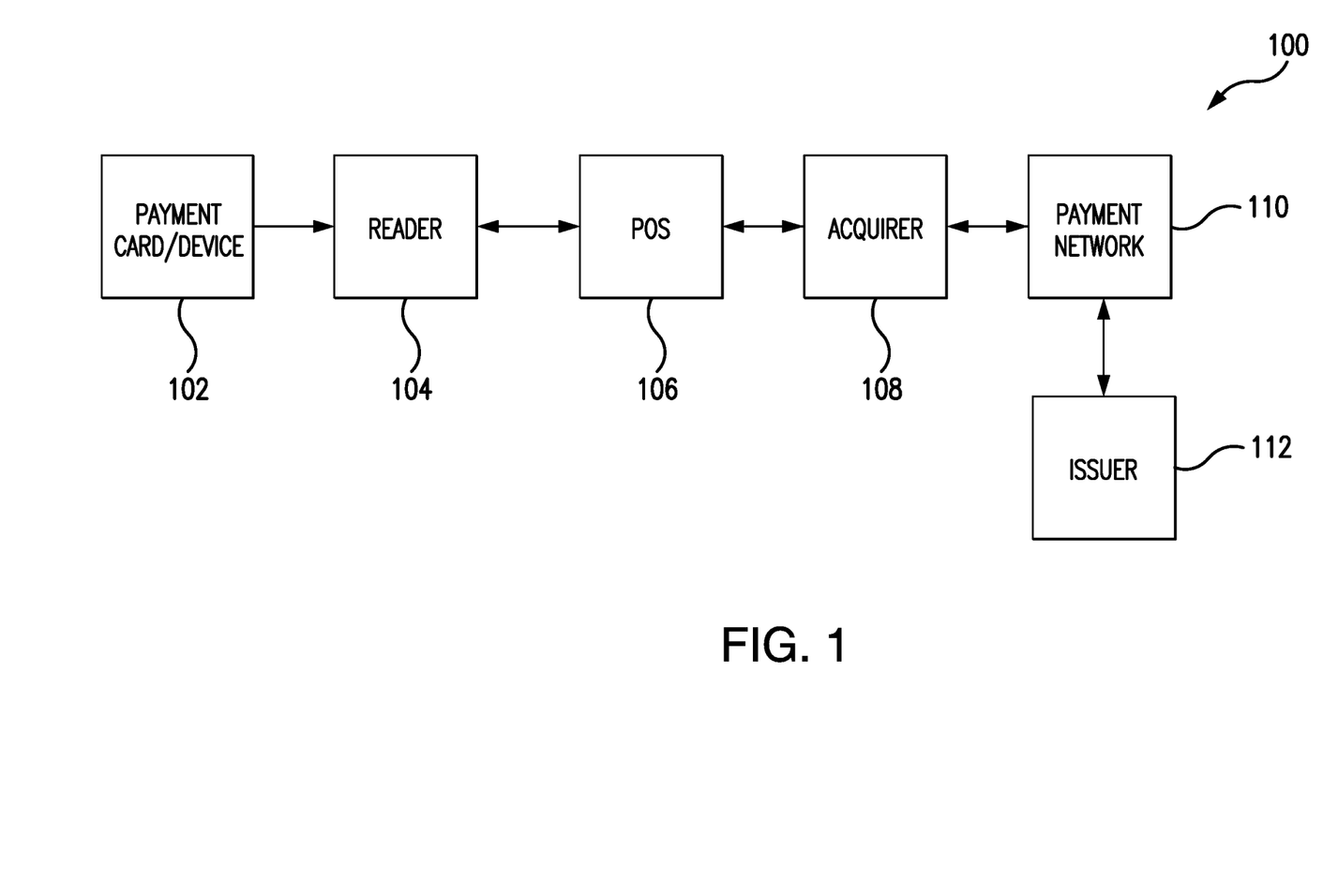
FIG. 1 is a block diagram that illustrates a conventional payment system.

FIG. 1 is a block diagram that illustrates a conventional payment system 100.

The system 100 includes a payment device 102 (which may in some situations be a payment-enabled mobile device that stores a payment card account number and runs a payment applet; other form factors for the payment device, such as a fob, are also possible; also card-shaped payment devices, including payment IC cards and magnetic stripe cards are widely used). The system 100 further includes a reader component 104 associated with a POS (point of sale) terminal 106. In some known manner the reader component 104 is capable of reading the payment card account number and other information from the payment device 102. (Some usages include the term "point of interaction" to include both the point of sale at a retail store, plus card acceptance terminals or the like at premises of service providers, transit system entrance gate terminals, etc.)

The reader component 104 and the POS terminal 106 may be located at the premises of a retail store and operated by a sales associate of the retailer for the purpose of processing retail transactions. The payment device 102 is shown in FIG. 1 to be interacting with the reader component 104 and the POS terminal 106 for the purpose of executing such a transaction.

A computer 108 operated by an acquirer (acquiring financial institution) is also shown as part of the system 100 in FIG. 1. The acquirer computer 108 may operate to receive an authorization request for the transaction from the POS terminal 106. The acquirer computer 108 may route the authorization request via a payment network 110 (sometimes also referred to as a "card network") to the server computer 112 operated by the issuer of a payment account that is associated with the payment device 102. An authorization response generated by the payment account issuer server computer 112 may be routed back to the POS terminal 106 via the payment network 110 and the acquirer computer 108.

One well known example of a payment network is referred to as the "Banknet" system, and is operated by Mastercard International Incorporated, which is the assignee hereof.

The payment account issuer server computer 112 may be operated by or on behalf of a financial institution ("FI") that issues payment accounts to individual users and/or other entities. For example, the payment account issuer server computer 112 may perform such functions as (a) receiving and responding to requests for authorization of payment account transactions to be charged to payment accounts issued by the FI; and (b) tracking and storing transactions and maintaining account records.

The components of the system 100 as depicted in FIG. 1 are only those that are needed for processing a single transaction. A typical payment system may process many purchase transactions (including simultaneous transactions) and may include a considerable number of payment account issuers and their computers, a considerable number of acquirers and their computers, and numerous merchants and their POS terminals and associated reader components. The system may also include a very large number of payment account holders, who carry payment devices for initiating payment transactions by presenting an associated payment account number to the reader component of a POS terminal.

A typical payment system like that shown in FIG. 1 may also handle other types of transactions, including online shopping transactions in which the purchaser submits a payment account number and related data to an e-commerce website-hosting computer.

To safeguard the security of payment transactions involving payment-enabled mobile devices, it has been proposed—for at least some transactions—that a CDCVM (consumer device cardholder verification method) process be performed in the payment-enabled mobile device. As is familiar to those who are skilled in the art, "CVM" may be considered a synonym for user authentication. One proposal for CDCVM embraces the so-called "FIDO" (Fast Identity Online) protocol for user authentication. FIDO is well known in general to those who are skilled in the art, but a few salient characteristics of it will now be mentioned. With FIDO, the mobile device user biometrically (e.g., via fingerprint scan) unlocks cryptographic credentials stored in the device. The device verifies the biometric input and executes an authentication process via interaction with a remote authentication server. The remote server verifies the data submitted to it by the mobile device and authorizes a/the payment transaction. With FIDO, the biometric information never leaves the mobile device, which tends to preclude a number of different kinds of attacks, thereby enhancing the security of the user authentication.

One challenge faced with implementing FIDO for a payment-enabled mobile device is that it may sometimes be desired to use the device for a payment transaction in a location or at a time when the payment-enabled mobile device is not online with the remote authentication server. In such cases, a known local CDCVM process could be substituted for the usual FIDO CDCVM process, but that may risk causing confusion to the user due to a difference in the user experience between the FIDO CDCVM process and the local CDCVM process.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present disclosure, a payment-enabled mobile device may execute user authentication in accordance with the FIDO protocol on occasions when it is online with the authentication server. On other occasions, the payment-enabled mobile device may execute a local CDCVM process that emulates the user experience encountered with FIDO user authentication. To support the emulation, the payment-enabled mobile device may pre-store templates that simulate a FIDO authentication transaction. Further in support of emulation, during local CDCVM the payment-enabled mobile device may produce a counterfeit FIDO registration response payload to aid in engaging FIDO software in the mobile device to participate in the local CDCVM process.

Figure 2:
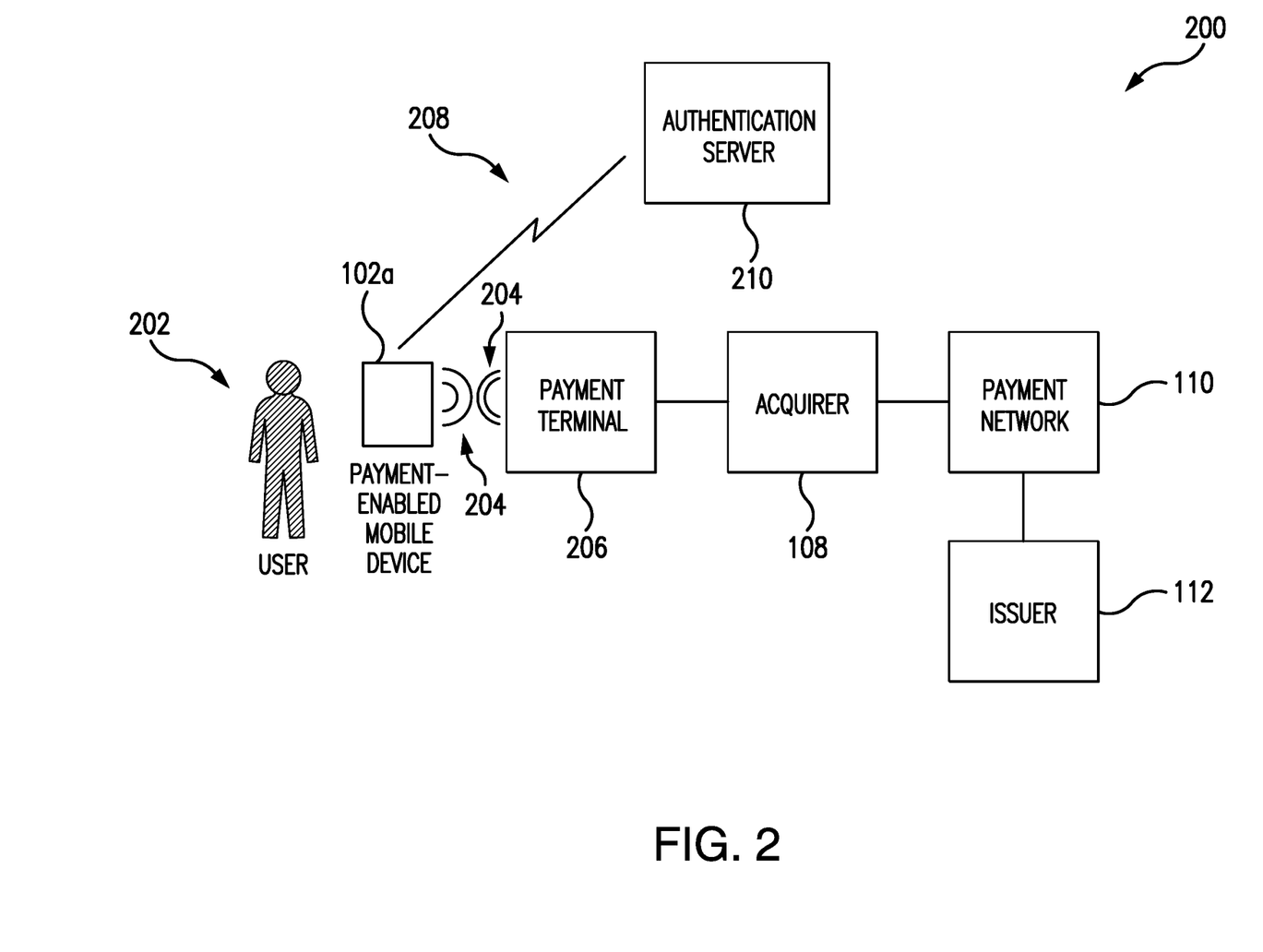
FIG. 2 is a block diagram that illustrates a payment system provided according to aspects of the present disclosure and in accordance with on online operating mode.

FIG. 2 is a block diagram that illustrates a payment system 200 provided according to aspects of the present disclosure. In particular, FIG. 2 portrays the payment system 200 with the payment-enabled mobile device 102a operating in what will be described below as an "online" operating mode.

In addition to and/or inclusive of components shown in FIG. 2, the payment system 200 may include all elements of the payment system 100 of FIG. 1 as mentioned above in connection with FIG. 1.

As seen in FIG. 2, a user/account holder 202 presents his/her payment-enabled mobile device 102a at a point of sale to interact (via short range-radio communication 204) with a payment terminal 206 for the purpose of initiating a payment transaction. The payment terminal 206 may encompass the reader 104 and the POS 106 shown in FIG. 1 and may operate in a manner typically seen in payment account transactions. As before, the payment system 200 may further include an acquirer 108. Still further, the payment system 200 may include a payment network (reference numeral 110), which may have typical transaction routing capabilities as normally provided by a payment network in a payment account system. Also shown is the account issuer 112 which had previously provisioned or caused to be provisioned a digitized payment account number to the payment-enabled mobile device 102a shown in FIG. 2.

Furthermore, the payment-enabled mobile device 102a is shown in data communication 208 with a remote user authentication server 210. The data communication 208 may be via one or both of (a) the internet; and (b) a mobile network (not separately shown) that serves the payment-enabled mobile device 102a. The data communication 208 between the payment-enabled mobile device 102a and the user authentication server 210 may be in accordance with a typical process for accomplishing FIDO user authentication of the user 202 via the payment-enabled mobile device 102a.

Figure 3:
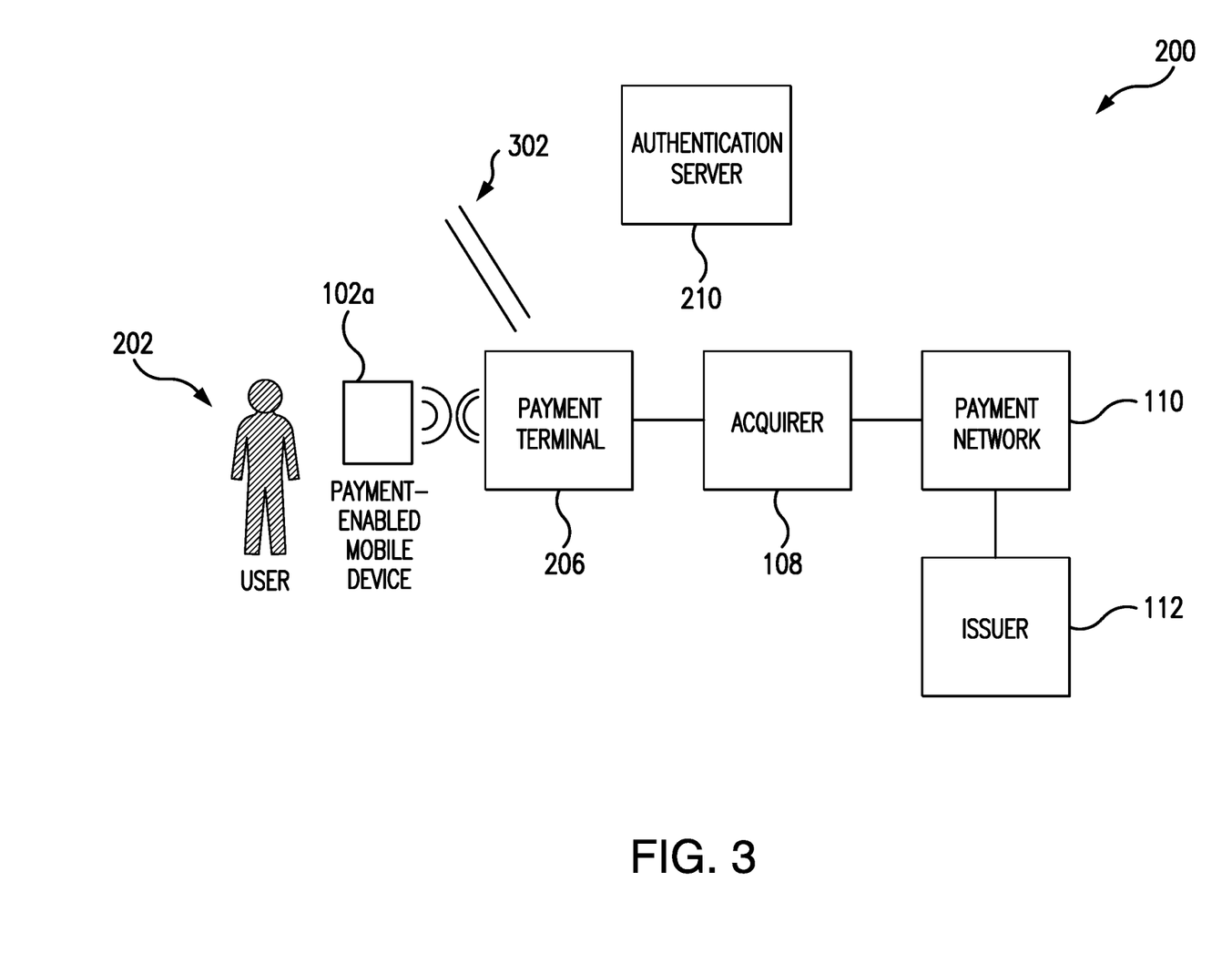
FIG. 3 is a block diagram similar to FIG. 2, but showing the payment system of FIG. 2 operating in an offline operating mode.

FIG. 3 is an alternate depiction of the payment system 200 of FIG. 2. FIG. 3 is the same as FIG. 2, except that FIG. 3 assumes (as schematically indicated at 302) that there is (in the scenario depicted in FIG. 3) no current availability of communications between the payment-enabled mobile device 102a and the user authentication server 210. In other words, vis a vis the user authentication server 210 and FIDO capabilities, the payment-enabled mobile device 102a may be considered "offline". The lack of availability of communications between the payment-enabled mobile device 102a and the user authentication server 210 may, for example, be due to the current location of the payment-enabled mobile device 102a, mobile network conditions, atmospheric and/or weather conditions, etc.

Figure 4:
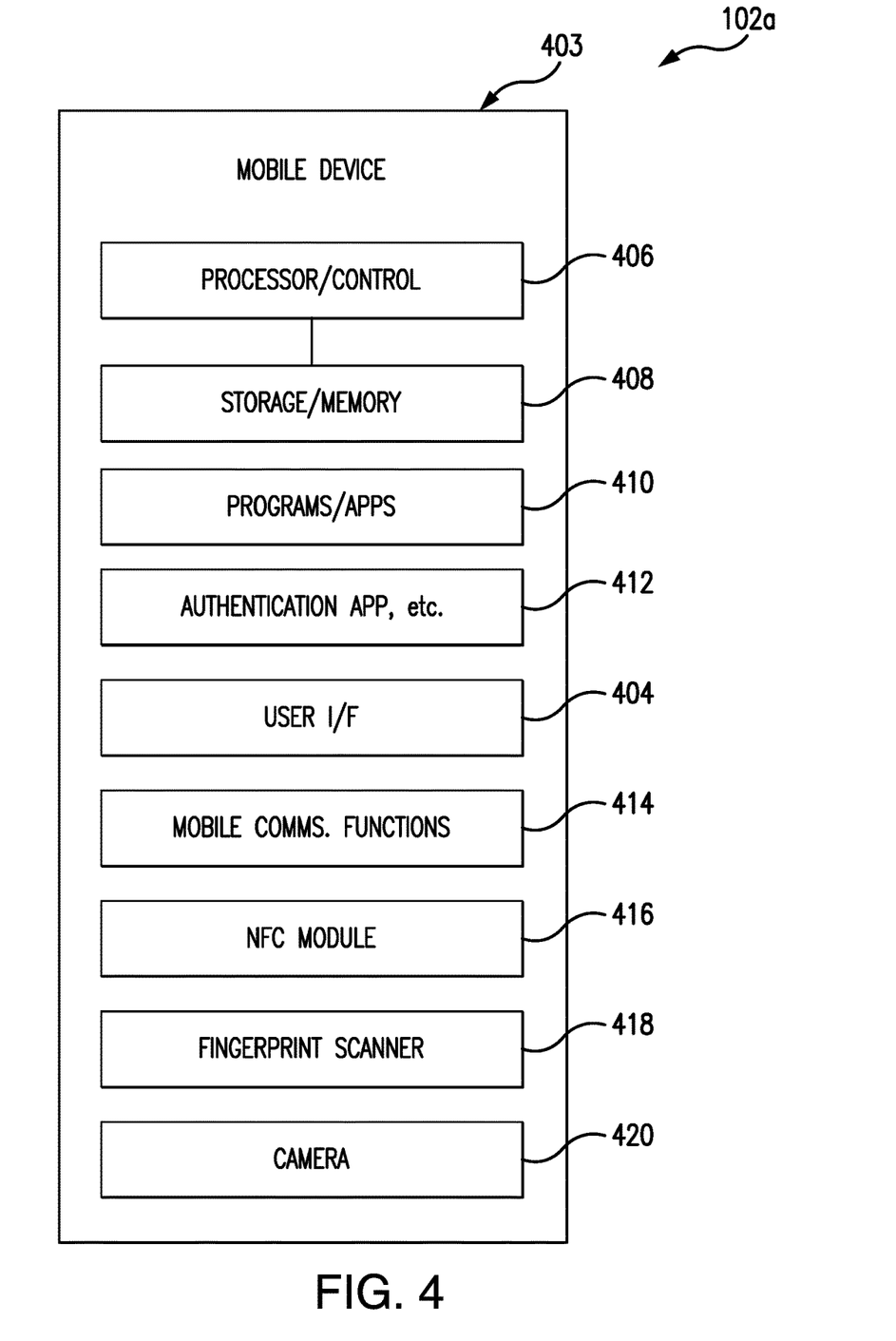
FIG. 4 is a simplified block diagram of a payment-enabled mobile device that may be operated in the payment system of FIGS. 2/3.

FIG. 4 is a simplified block diagram illustration of a typical embodiment of the payment-enabled mobile device 102a shown in FIGS. 2 and 3.

To some extent, it will be posited in the following discussion, without limitation, that the payment-enabled mobile device 102a is a smartphone.

The payment-enabled mobile device 102a may include a housing 403. In many embodiments, the front of the housing 403 is predominantly constituted by a touchscreen (not separately shown), which is a key element of the user interface 404 of the payment-enabled mobile device 102a.

The payment-enabled mobile device 102a further includes a mobile processor/control circuit 406, which is contained within the housing 403. Also included in the payment-enabled mobile device 102a is a storage/memory device or devices (reference numeral 408). The storage/memory devices 408 are in communication with the processor/control circuit 406 and may contain program instructions to control the processor/control circuit 406 to manage and perform various functions of the payment-enabled mobile device 102a. As is well-known, a smartphone may function as what is in effect a pocket-sized personal computer, via programming with a number of application programs, or "apps", as well as a mobile operating system (OS). (The apps are represented at block 410 in FIG. 4, and may, along with other programs, in practice be stored in block 408, to program the processor/control circuit 406.) In view of the pertinence of user authentication functionality to the teachings of this disclosure, an authentication app and related apps/programs are shown separately from the apps 410 and are represented by block 412. As will be seen, the authentication app and related apps 412 may cause the payment-enabled mobile device 102a to operate in a number of different operating modes, according to various circumstances encountered in using the payment-enabled mobile device 102a. The operating modes may include an online authentication mode and an offline authentication mode, as well as one or more other modes to support related functions of the payment-enabled mobile device 102a in the offline mode.

As is typical for smartphones, the payment-enabled mobile device 102a may include mobile communications functions as represented by block 414 (FIG. 4). The mobile communications functions may include voice and data communications via the above-mentioned mobile network (not shown), whereby the payment-enabled mobile device 102a may at times be "online" (as per FIG. 2)—that is, in communication with the authentication server 210. At least some portions of the authentication app and related apps 412 may have been provisioned to the payment-enabled mobile device 102a from the payment network 110 or by a service entity affiliated with the payment network 110 or the issuer 112.

Moreover, the payment-enabled mobile device 102a may further include hardware and software/firmware to implement NFC (near field communication) capabilities or the like (represented by block 416 in the drawing) to facilitate interactions/short range-data communication between the payment-enabled mobile device 102a and the payment terminal 206 (FIGS. 2/3). Thus the NFC capabilities 416 support the payment-related functionality of the payment-enabled mobile device 102a.

According to the example embodiment of FIG. 4, the payment-enabled mobile device 102a may also include a fingerprint scanning module 418 such as is now included in some mobile devices to support biometric user authentication in connection with payment transactions or for other purposes. The fingerprint scanning module 418 may play a role in user authentication processes of the payment-enabled mobile device 102a, as described herein.

As is also commonly the case with smartphones, the payment-enabled mobile device 102a may also include a digital camera 420. The digital camera 420 may, in some embodiments, play a role in user authentication processes of the payment-enabled mobile device 102a.

From the foregoing discussion, it will be appreciated that the blocks depicted in FIG. 4 as components of the payment-enabled mobile device 102a may in effect overlap with each other, and/or there may be functional connections among the blocks which are not explicitly shown in the drawing. It may also be assumed that, like a typical smartphone, the payment-enabled mobile device 102a may include a rechargeable battery (not shown) that is contained within the housing 403 and that provides electrical power to the active components of the payment-enabled mobile device 102a.

Although the payment-enabled mobile device 102a has been described herein primarily as a smartphone, other types of mobile devices (e.g., a tablet computer) may be used in place of a smartphone in other embodiments.

Figure 5:
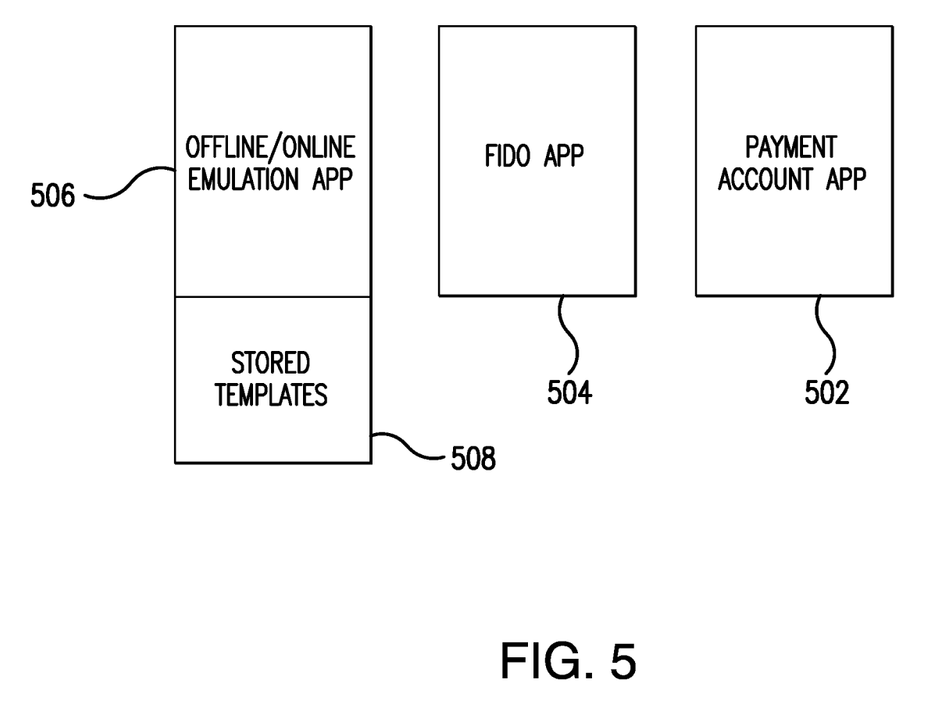
FIG. 5 schematically illustrates software aspects of the payment-enabled mobile device of FIG. 4.

FIG. 5 schematically illustrates software aspects of the payment-enabled mobile device 102a depicted in FIG. 4. The software entities depicted in FIG. 5 may be stored in and/or run on the payment-enabled mobile device 102a.

Block 502 in FIG. 5 represents a payment account app, of a kind that may be provisioned to the payment-enabled mobile device 102a to enable the payment-enabled mobile device 102a to interact with payment terminals for the purpose of engaging in payment account system transactions. It will be appreciated that the payment account app 502 may allow the user 202 to access (and to communicate to the payment terminal) a payment account number or payment token that represents the user's payment system account to which the transaction is to be charged. In some embodiments, more than one payment account app may be stored in the payment-enabled mobile device 102a, to give access to a number of different payment accounts from which the user may select one to use for the current transaction. In some embodiments, the payment account app or apps may be managed (and access to the same obtained) via a wallet app, which is not represented in the drawings.

Block 504 represents a FIDO app, which has also been provisioned to the payment-enabled mobile device 102a. The FIDO app 504 need not deviate from accepted principles for FIDO authentication processes in mobile devices, and may accordingly play a role in user authentication when the payment-enabled mobile device 102a is in the online authentication mode of operation. Moreover, in accordance with teachings of this disclosure, other software entities in the payment-enabled mobile device 102a may provide inputs to the FIDO app 504 such that the FIDO app 504 is induced to play a role in offline authentication operation of the payment-enabled mobile device 102a, without the FIDO app 504 departing from its normal functioning for online authentication and without the FIDO app 504 being aware that the authentication operation in question is not an online authentication.

Block 506 in FIG. 5 represents an app provided in accordance with aspects of the present disclosure to operate such that the payment-enabled mobile device 102a is enabled to perform user authentication offline in a manner that emulates—for the user experience—an online FIDO authentication operation. As will be seen, to implement such emulation, the emulation app 506 may provide at least some of the above-mentioned inputs to induce the FIDO app 504 to participate in offline authentication. Details of operation of the emulation app 506 will be described below.

Block 508 represents one or more authentication policy templates stored in association with (and for access by) the emulation app 506 for use in connection with generating data messaging required for offline user authentication by the payment-enabled mobile device 102a with FIDO emulation for the user experience. It is to be understood that the policy templates stored at 508 may be retrieved by the emulation app 506 from the authentication server 210 (FIG. 2) during a set-up/configuration mode of the payment-enabled mobile device 102a and/or the emulation app 506. According to one or more authentication policy templates, a fingerprint biometric user authentication process is to be performed/emulated, whereas in one or more other authentication policy templates, another type of biometric user authentication (e.g., facial recognition) is to be performed/emulated.

Figure 6A:
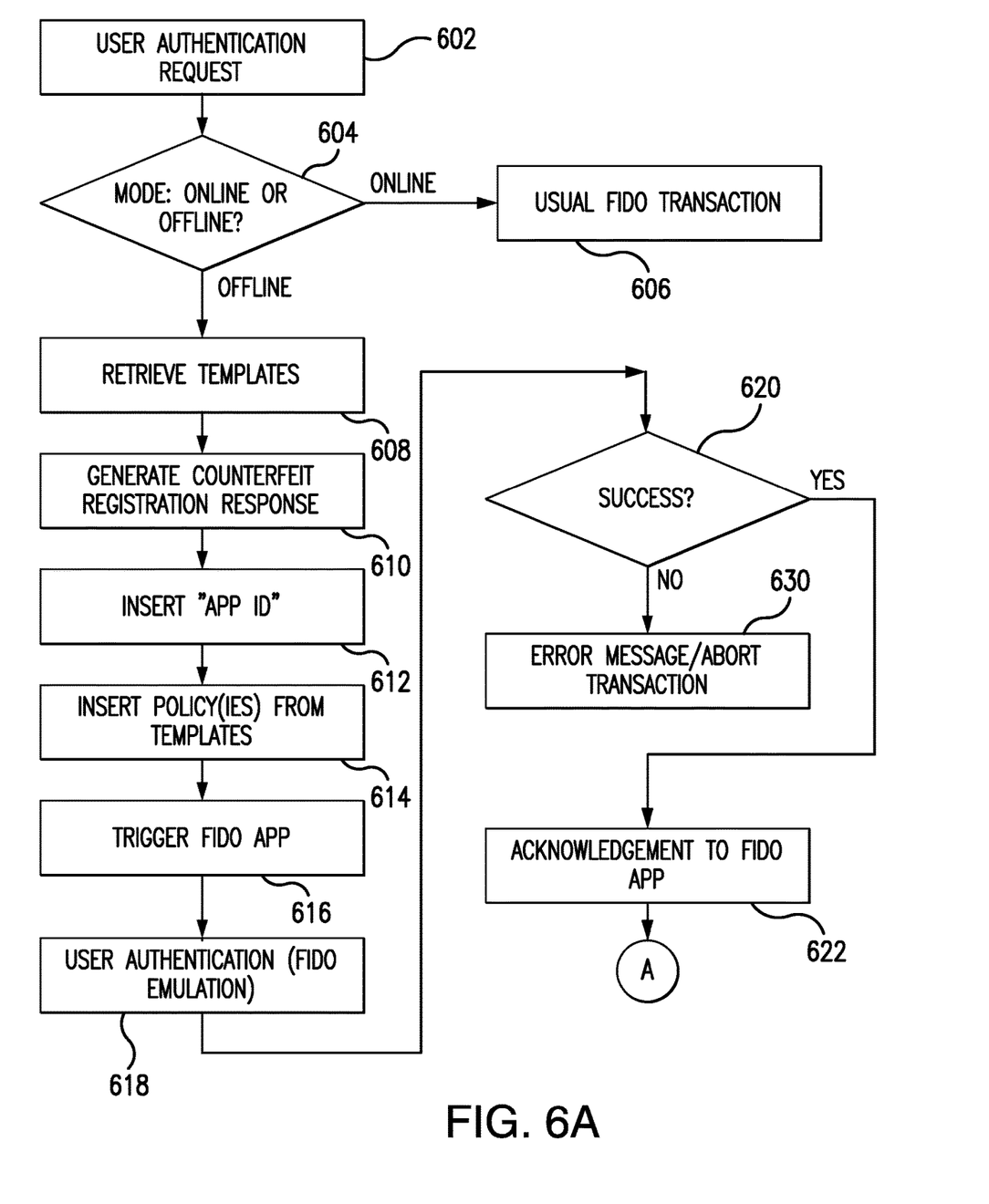
FIGS. 6A and 6B together form a flow chart that illustrates a process that may be performed in the payment system of FIGS. 2/3 according to aspects of the present disclosure.
Figure 6B:
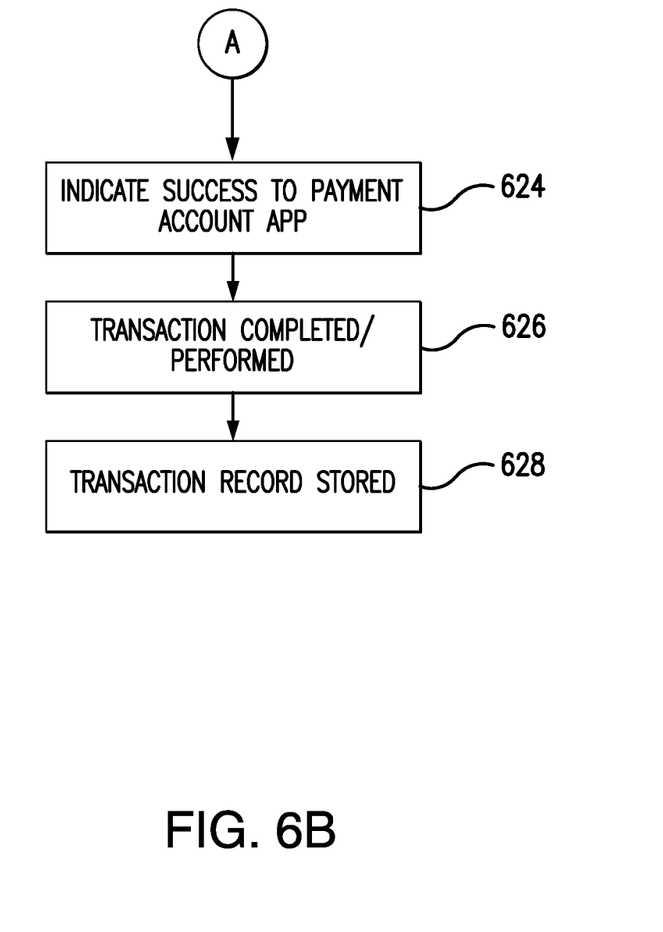

FIGS. 6A and 6B together form a flow chart that illustrates a process that may be performed in the payment system 200, and particularly in/with the payment-enabled mobile device 102a, according to aspects of the present disclosure.

At 602 in FIG. 6A, the emulation app 506, or a software entity associated therewith, receives a request that a user authentication be performed. This may occur, for example, when a user requests access to a particular payment account app in the payment-enabled mobile device 102a and/or during the course of a payment transaction/interaction between the payment-enabled mobile device 102a and the payment terminal 206.

Decision block 604 follows block 602 in the process of FIGS. 6A/6B. At decision block 604, it is determined whether the payment-enabled mobile device 102a is online with the authentication server or whether this is not the case, such that the payment-enabled mobile device 102a is offline. This determination may, for example, be made by the emulation app 506.

If, at decision block 604, the payment-enabled mobile device 102a is determined to be online, then block 606 may follow decision block 604 in the process of FIGS. 6A/6B. At block 606, user authentication proceeds in accordance with generally applicable principles of the FIDO protocol, including interaction between the payment-enabled mobile device 102a and the authentication server 210.

However, if, at decision block 604, the payment-enabled mobile device 102a is determined to be offline, then block 608 may follow decision block 604 in the process of FIGS. 6A/6B. At block 608, the emulation app 506 may retrieve the policy template(s) stored as described above in connection with block 508 of FIG. 5.

From above discussion, it will be appreciated that the branching from 604 to 606 may occur on some occasions, such as those illustrated in FIG. 2. Further, the branching from 604 to 608 may occur on other occasions, such as those illustrated in FIG. 3.

Continuing to refer to FIG. 6A, block 610 may follow block 608. At block 610, the emulation app 506 may generate a counterfeit version of the type of UAF (Universal Authentication Framework) registration response payload of the type that would typically be received by the payment-enabled mobile device 102a from the authentication server 210 on occasions when a typical FIDO authentication procedure takes place.

Block 612 may follow block 610. At block 612, the emulation app 506 may insert an "app identifier" string, which may be or simulate a digital signature that would be produced when a typical FIDO authentication procedure takes place.

Block 614 may follow block 612. At block 614, the emulation app 506 may insert one or more authentication policy identifiers (e.g., AAID(s)—Authenticator Attestation Identifier(s)). As is familiar to those who are skilled in the art, a specific AAID may call for a particular type of biometric authentication procedure, such as a fingerprint scan and/or a facial recognition scan via the camera 420 of the payment-enabled mobile device 102a.

Block 616 may follow block 614. At block 616, and using at least some of the data/information retrieved, generated and/or inserted at blocks 608-614, the emulation app 506 may trigger (i.e., send a request message to) the FIDO app 504, to cause the FIDO app 504 to play a role in a user authentication process. It should be noted that it may be the case that the FIDO app 504 communicates only with other software entities in the payment-enabled mobile device 102a and does not communicate in direct terms with the authentication server 210 (which in any case is not involved in the process branch now being discussed). Through the emulation activities of the emulation app 506, the FIDO app 504 may be enabled to play its role in the current offline authentication process as if the current process were a typical online FIDO authentication process. Block 618 represents the FIDO emulation/user authentication process performed at least in part by the FIDO app 504, and may include messaging from the FIDO app 504 to the applicable payment account app 502 to display prompts, etc. to the user to bring about user cooperation with the user authentication process in the same manner that the user would have experienced if the current process branch had been an online FIDO process. Thus, the emulation operation of block 618 may show the same sequence of screen displays to the user as are presented to the user in connection with an online FIDO authentication in the payment-enabled mobile device 102a. Accordingly, even though the current process is offline rather than online, the user has the same experience as the usual online FIDO process, and user confusion can thereby be avoided.

Decision block 620 follows block 618. At decision block 620, the FIDO app 504 may determine whether or not the user authentication was successful. If so, then block 622 may follow decision block 620. At block 622, upon the FIDO app 504 having communicated successful user authentication to the emulation app 506, the emulation app 506 may send a suitable acknowledgement message (as would occur in an online FIDO process) to the FIDO app 504.

Block 624 (FIG. 6B) may follow block 622. At block 624, the emulation app 506 may indicate to the payment account app 502 that successful user authentication has occurred. Then the payment account transaction may proceed/be completed (block 626), and the emulation app 506 may store a record of the user authentication transaction (block 628).

Referring again to FIG. 6A, and considering again decision block 620, if at that decision block the FIDO app 504 determines that the user authentication was not successful, then block 630 may follow decision block 620. At block 630, the FIDO app 504 may communicate the process failure to the emulation block 506, which may in turn communicate the process failure to the payment account app 502, leading to displaying of an error message and aborting of the proposed payment account transaction. A record of the unsuccessful authentication transaction may also be stored.

Figure 7:
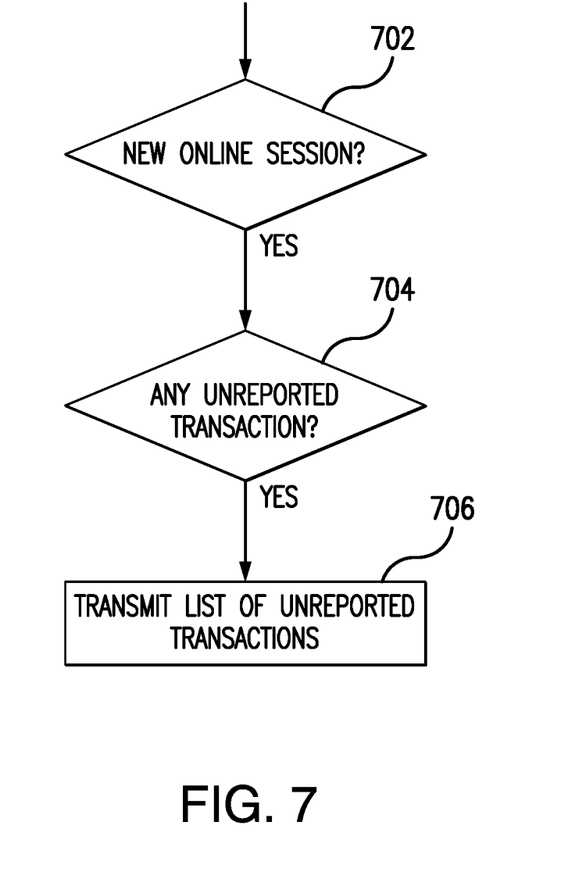
FIG. 7 is a flow chart that illustrates another process that may be performed in the payment system of FIGS. 2/3 according to aspects of the present invention.

FIG. 7 is a flow chart that illustrates another process that may be performed in the payment system 200 according to aspects of the present invention. The process of FIG. 7 may be performed on occasions other than those referred to in connection with branches 606, 608 of FIG. 6A, and may represent a further mode of operation of the payment-enabled mobile device 102a.

At decision block 702, the emulation app 506 may determine whether a new online session has begun for the payment-enabled mobile device 102a vis a vis the authentication server 210. If so, then decision block 704 may follow decision block 702. At decision block 704, the emulation app 506 may determine whether it has records of any offline transactions that have not previously been uploaded to the authentication server. If so, then block 706 follows decision block 704. At block 706, the emulation app 506 may upload/transmit the non-reported offline transactions (e.g., via the payment account app 502) to the authentication server 210.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, the terms "server" or "server computer" should be understood to refer to a computer that handles requests for service from numerous client devices and/or entities.

The flow charts and descriptions thereof herein should not be understood to prescribe a fixed order of performing the method steps described therein. Rather the method steps may be performed in any order that is practicable, including simultaneous performance of at least some steps and/or omitting one or more steps.

As used herein and in the appended claims, the term "payment card system account" includes a credit card account or a deposit account that the account holder may access using a debit card. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card or a debit card. The terms "payment card account", "payment card system account" and "payment account" are used interchangeably herein.

As used herein and in the appended claims, the term "payment card system" refers to a system for handling purchase transactions and related transactions. An example of such a system is the one operated by Mastercard International Incorporated, the assignee of the present disclosure. In some embodiments, the term "payment card system" may be limited to systems in which member financial institutions issue payment card accounts to individuals, businesses and/or other organizations.

Although the subject matter of the present disclosure has been described in connection with specific exemplary embodiments, it should be understood that various changes, substitutions, and alterations apparent to those skilled in the art can be made to the disclosed embodiments without departing from the spirit and scope of the present disclosure as set forth in the appended claims.

What is claimed is:

1. A payment-enabled mobile device operable in a first operating mode and a second operating mode, the first operating mode being an online operating mode, the second operating mode being an offline operating mode, the payment-enabled mobile device operating in said second operating mode to replicate a screen display sequence presented by said payment-enabled mobile device in said first operating mode;
   wherein, in the second operating mode, a software entity in the payment-enabled mobile device generates a counterfeit version of a registration response payload that is received by the payment-enabled mobile device from a remote server when the payment-enabled mobile device operates in said first operating mode to perform a transaction in said first operating mode.

2. The payment-enabled mobile device of claim 1, wherein the payment-enabled mobile device operates in accordance with the FIDO (Fast Identity Online) protocol in the first operating mode.

3. The payment-enabled mobile device of claim 2, wherein the payment-enabled mobile device enforces a FIDO user authentication policy in the first operating mode, the policy requiring a biometric authentication process, the payment-enabled mobile device engaging in said biometric authentication process in said second operating mode.

4. The payment-enabled mobile device of claim 3, wherein the payment-enabled mobile device is further operable in a third operating mode different from the first and second operating modes, said payment-enabled mobile device transmitting a list of transaction data to the remote server during an operation in said third operating mode, said transaction data representing transactions performed by said payment-enabled mobile device in said second operating mode at times prior to said operation in said third operating mode.

5. The payment-enabled mobile device of claim 3, wherein said replicated screen display sequence in said second operating mode includes at least one screen display to prompt user cooperation with said biometric authentication process.

6. The payment-enabled mobile device of claim 3, wherein said payment-enabled mobile device engages in payment transactions in said first and second operating modes, each of said payment transactions including interaction between said payment-enabled mobile device and a respective payment terminal that is co-located with the payment-enabled mobile device during said each transaction.

7. A method comprising:
   operating a payment-enabled mobile device in a first operating mode on a first occasion, said first operating mode being an online operating mode; and
   operating the payment-enabled mobile device in a second operating mode on a second occasion, said second operating mode being an offline operating mode;
   wherein, in the second operating mode the payment-enabled mobile device operates to replicate a screen display sequence presented by said payment-enabled mobile device in said first operating mode: and
   wherein, in the second operating mode, a software entity in the payment-enabled mobile device generates a counterfeit version of a registration response payload that is received by the payment-enabled mobile device from a remote server when the payment-enabled mobile device operates in said first operating mode.

8. The method of claim 7, wherein the payment-enabled mobile device operates in accordance with the FIDO (Fast Identity Online) protocol in the first operating mode.

9. The method of claim 8, wherein the payment-enabled mobile device enforces a FIDO user authentication policy in the first operating mode, the policy requiring a biometric authentication process, the payment-enabled mobile device engaging in said biometric authentication process in said second operating mode.

10. The method of claim 9, further comprising:
    operating the payment-enabled mobile device in a third operating mode on a third occasion, the third operating mode different from said first and second operating modes, said payment-enabled mobile device transmitting a list of transaction data to the remote server during an operation in said third operating mode, said transaction data representing transactions performed by said payment-enabled mobile device in said second operating mode at times prior to said operation in said third operating mode.

11. The method of claim 9, wherein said replicated screen display sequence in said second operating mode includes at least one screen display to prompt user cooperation with said biometric authentication process.

12. The method of claim 9, wherein said payment-enabled mobile device engages in payment transactions in said first and second operating modes, each of said payment transactions including interaction between said payment-enabled mobile device and a respective payment terminal that is co-located with the payment-enabled mobile device during said each transaction.

13. A non-transitory storage medium, the storage medium storing program instructions to control a processor to perform functions as follows:
    operating a payment-enabled mobile device in a first operating mode on a first occasion, said first operating mode being an online operating mode; and
    operating the payment-enabled mobile device in a second operating mode on a second occasion, said second operating mode being an offline operating mode;
    wherein, in the second operating mode the payment-enabled mobile device operates to replicate a screen display sequence presented by said payment-enabled mobile device in said first operating mode; and
    wherein, in the second operating mode, a software entity in the payment-enabled mobile device generates a counterfeit version of a registration response payload that is received by the payment-enabled mobile device from a remote server when the payment-enabled mobile device operates in said first operating mode.

14. The storage medium of claim 13, wherein the payment-enabled mobile device operates in accordance with the FIDO (Fast Identity Online) protocol in the first operating mode.

15. The storage medium of claim 14, wherein the payment-enabled mobile device enforces a FIDO user authentication policy in the first operating mode, the policy requiring a biometric authentication process, the payment-enabled mobile device engaging in said biometric authentication process in said second operating mode.

16. The storage medium of claim 15, further storing instructions to control the processor to operate the payment-enabled mobile device in a third operating mode on a third occasion, the third operating mode different from said first and second operating modes, said payment-enabled mobile device transmitting a list of transaction data to the remote server during an operation in said third operating mode, said transaction data representing transactions performed by said payment-enabled mobile device in said second operating mode at times prior to said operation in said third operating mode.

17. The storage medium of claim 15, wherein said replicated screen display sequence in said second operating mode includes at least one screen display to prompt user cooperation with said biometric authentication process.

* * * * *